United States Patent [19]
Greenhut

[11] Patent Number: 4,749,484
[45] Date of Patent: Jun. 7, 1988

[54] HOME WATER FILTER

[75] Inventor: Bart Greenhut, Los Angeles, Calif.

[73] Assignee: Shapiro/Devine, Los Angeles, Calif.

[21] Appl. No.: 916,192

[22] Filed: Oct. 7, 1986

[51] Int. Cl.4 .............................................. B01D 23/26
[52] U.S. Cl. ..................................... 210/266; 210/472
[58] Field of Search ............... 210/266, 282, 436, 455, 210/472, 474, 669, 774, 806, 807

[56] References Cited

U.S. PATENT DOCUMENTS 1,645,712 10/1927 Meyers .................................. 210/472
1,696,487 12/1928 Jervis .................................... 210/472

Primary Examiner—Ivars Cintins
Attorney, Agent, or Firm—Freilich, Hornbaker, Rosen & Fernandez

[57] ABSTRACT

A water filter apparatus is provided, which is especially useful in filtering out chemicals from tap water. The filter includes upper and lower vessels and a filter assembly between them which includes activated charcoal for adsorbing chemicals. The filter assembly includes a filter housing with inlet holes near the bottom of the upper vessel and a filter vent near the top of the upper vessel for releasing gas produced during filtering through the activated charcoal. A ring-shaped preliminary filter lies around the inlet holes, to avoid blocking the upward passage of gas through the vent. The filter extends partially through the holes, to lie closely along the path of upwardly-flowing gas bubbles, so the bubbles tend to drag along gas forming at the inside of the preliminary filter. A cap assembly on the upper vessel permits the escape of vented gas while avoiding splashing. The container is preferably placed in a refrigerator during filtering, to aid in adsorption of chemicals.

9 Claims, 2 Drawing Sheets

HOME WATER FILTER

BACKGROUND OF THE INVENTION

Tap water available in most areas of the United States contains appreciable amounts of chemicals, and there is a question as to whether such chemicals can do harm to people. Charcoal filters can be used to remove such chemicals, but previous water filters that have been available have not been convenient and effective. A preliminary filter is generally used to block out particles before they pass through the activated charcoal filter. However, such a preliminary filter may block the venting of gas dissolved in the water and/or released during filtration by the activated charcoal, to clog the system. A filtration apparatus which was compact and operated effectively, would be of considerable value.

SUMMARY OF THE INVENTION

In accordance with one embodiment of the present invention, an effective water-filter apparatus is provided. The apparatus can include upper and lower vessels and a filter assembly lying between them. The filter assembly can include a primary filter, a filter vent extending above the primary filter to near the top of the upper vessel, and a preliminary filter lying near the bottom of the upper vessel, along the path of gas bubbles flowing upwardly along the filter vent. The primary filter can be formed of activated charcoal, and is especially effective when the apparatus is placed in a refrigerator.

The novel features of the invention are set forth with particularity in the appended claims. The invention will be best understood from the following description when read in conjunction with the accompanying drawings.

BRIEF DESCRIPTION OF THE DRAWINGS

FIG. 5 is a view taken on the line 5—5 of FIG. 4.

DESCRIPTION OF THE PREFERRED EMBODIMENTS

Figure 1:
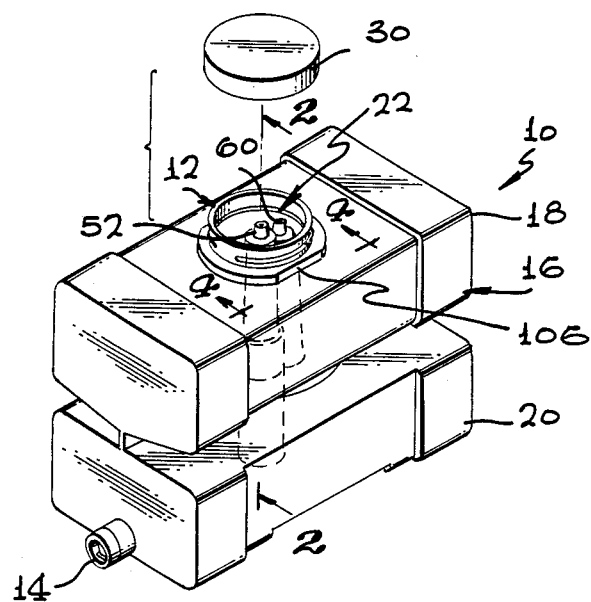
FIG. 1 is a perspective view of a water-filter apparatus of the present invention, shown with the cap raised.

FIG. 1 illustrates a water-filter apparatus 10 which includes a fill-up nipple 12 for receiving water which may contain chemicals to be removed, such as tap water, and a spigot 14 for discharging purified water. The apparatus includes a container 16 forming an upper vessel 18 which receives the tap water and a lower vessel 20 which holds filtered water, and surrounding a filter assembly 22 lying between the vessels.

A person uses the apparatus by removing a cap 30 from the fill-up nipple 12, and pouring water into the upper vessel until it is almost filled. The apparatus is then preferably placed in a refrigerator, where the water is cooled while it slowly passes through the filter apparatus 22. After perhaps two hours, most or all of the water has passed through the filter apparatus to the lower vessel 20. At any time thereafter, a person can operate the spigot 14 to obtain purified water.

Figure 2:
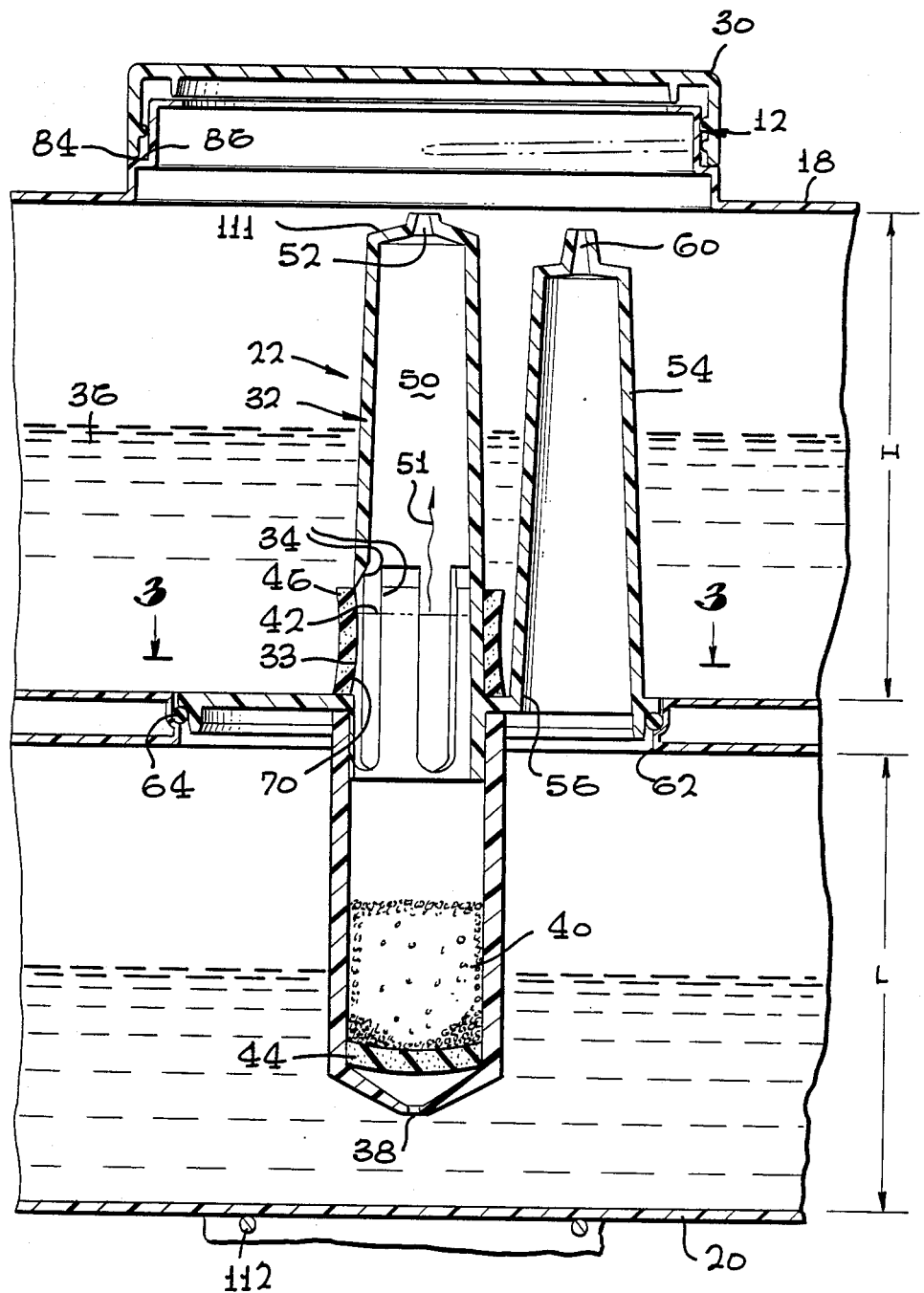
FIG. 2 is a view taken on the line 2—2 of FIG. 1.
Figure 3:
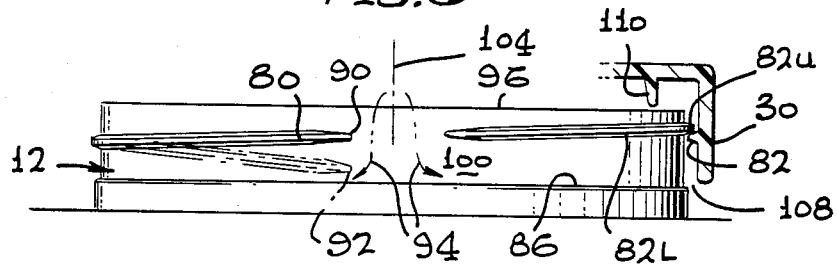

As shown in FIG. 2, the filter assembly 22 includes a filter housing 32 with a hollow inlet portion 33 having a cylindrical outside shape, near the bottom of the upper vessel. The inlet portion includes an inlet 34 formed by several radially-extending through holes near the bottom of the upper vessel 18, for receiving water 36 to be filtered. The housing also has an outlet 38 lying below the inlet and in the lower vessel for discharging filtered water into the lower vessel. A large area-contact primary filter 40 within the filter housing, is formed by a mass of fine granules of activated charcoal formed as a column extending up to a height such as shown at 42. An outlet filter 44, which serves as a flow-rate control filter to assure that fluid passes slowly through the primary filter, lies between the bottom of the primary filter and the outlet 38. A preliminary filter 46 lies at the inlet holes 34, to block them so water passing through the holes must also pass through the preliminary filter 46. The preliminary filter serves to prevent the passage of particles into the primary filter.

As water flows through the preliminary and primary filters 46, 40, gas is released which flows upwardly as bubbles. If the preliminary filter lay directly on top of the primary filter 40, the bubbles could block the flow of water through the preliminary filter in an unpredictable way, especially if the preliminary filter has very fine pores on the order of 1,000th inch. Applicant leaves the region 50 above the primary filter 40 unblocked by a fine-pore filter, so gas can bubble up through the filter housing along a path 51 to a filter vent 52 lying near the upper end of the upper vessel.

The filter assembly 22 also includes a lower vessel vent 54 having a lower end 56 open to the top of the lower vessel to receive air displaced by water entering the lower vessel. The vent tube has an upper end 60 forming a hole near the upper end of the upper vessel for venting air. Air is vented to the atmosphere between the cap 30 and nipple 12, as will be described below. The filter assembly is sealed to a hole 62 in the container between the vessels, by an O-ring 64. The filter assembly snaps in place by forming the filter assembly and hole 62 with appropriate snap-in projections (not shown).

Figure 3:
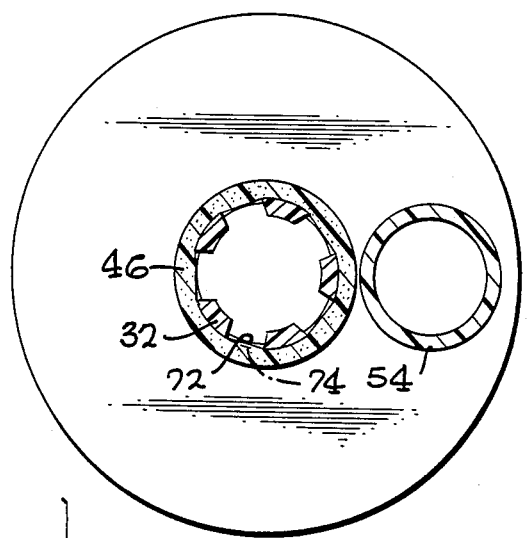
FIG. 3 is a view taken on the line 3—3 of FIG. 2.

The preliminary filter 46 is preferably formed of an elastomer having numerous open cells. Both the preliminary filter 46 and outlet filter 44 can be formed of a compressed flexible polyester polyurethane foam of types sold by Scotfoam of Edistone, Pa., wherein the foam has been compressed to 1/6th or 1/12th of its original thickness. The preliminary filter 46 is formed of a short cylinder of such material, which has an inside which, when undeflected, has a diameter which is smaller than the outside diameter of the filter housing at the location of the inlet holes 34. Accordingly, the preliminary filter 46 makes an interference fit with the outside of the filter housing and the inlet holes, which serves to hold the filter tightly in place. The holes 34 are wide enough that the filter projects into the holes 34. This can be seen in FIG. 3, where a portion 72 of the preliminary filter is shown as extending inwardly of a circular extension 74 of the outside of the filter housing at the height of the inlet holes. Thus, the inside of the preliminary filter lies substantially flush with the inside walls of the housing lying below the preliminary filter. As a result, as gas bubbles bubble up along the path 51, they tend to sweep across the inside of the preliminary filter 46 to drag away gas bubbles lying therein.

The outlet filter 44 is preferably formed of compressed foam, such as Scotfelt sold by Scotfoam referred above, where the foam which originally had 90 pores per linear inch, has been compressed to about 1/12th its original thickness. This results in connected capillaries within the outlet filter material forming a pathway through the outlet filter 44 for water. Most capillaries have a length over five times their width, and a width less than one hundred microns. The flow through such capillaries is very slow, to assure that water will flow slowly through the primary filter 40 to provide time for adsorption of a very high proportion of chemicals from the water. It would be possible to use one or several fine screens to limit the flow rate of water through the primary filter. However, it can require a pressure of several inches of water to force water through a fine screen. The fine capillaries of the outlet filter 44 act like wicks which flow water very slowly even with a small water pressure, such as less than one inch. This increases the reliability of the device, especially where the containers have only small heights H, L, which are each about 3 inches, so that the last inch or so of water in the upper vessel, representing about one-third of the total water filtered, can still flow reliably, even though the pressure difference is then about 2 inches or less.

Figure 4:
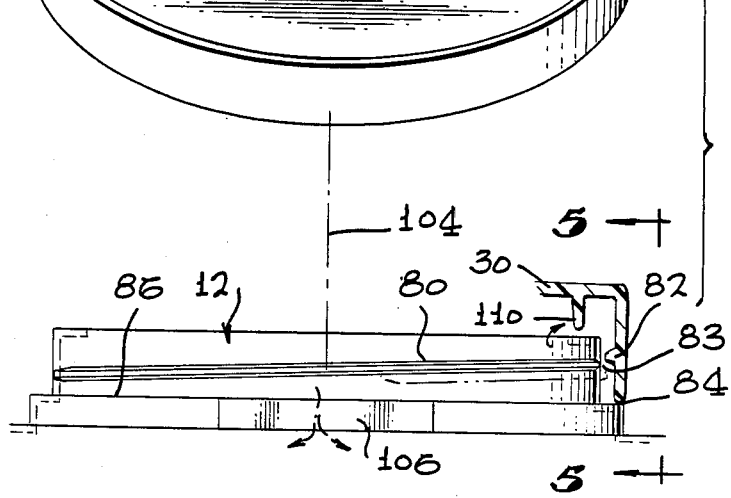
FIG. 4 is a view taken in the direction of line 4—4 of FIG. 1.

The fill-up nipple 12 and cap 30 are formed, as shown in FIGS. 4 and 5, to minimize spillage, and yet to provide a reliable vent for the passage of air, such as when water is taken from the container. The nipple 12 has an external thread 80 which is engaged by an internal thread 82 on the cap. The cap thread 82 fits loosely around the nipple during screwing and unscrewing the cap so there is a space 83 between the cap thread and the unthreaded regions of the nipple. However, when the cap is screwed on all the way, its bottom 84 presses firmly against a flange 86 formed on the container at the bottom of the nipple. At that time, the upper side 82U of the cap thread 82 presses firmly against the lower side 80L of the nipple thread 80. As shown in FIG. 5, the nipple thread 80 is interrupted in that it has interruptions 90, 92 on opposite sides of the nipple. Air can pass along the paths 94 through the free space between the cap and nipple, around the lip or top 96 of the nipple, through the thread-free region 100 lying between the interruption in the nipple thread and the loose-fitting cap thread, and along the regions 102 between the flange 86 and the threads, about ninety degrees about a vertical axis 104 to a cut-away region 106 of the flange. At the cut-away region 106, there is an escape opening or space 108 under the bottom of the cap that is not supported on the flange, and air can pass therethrough. It may be noted that the cap has a splash-resisting ring 110 extending to near the top of the nipple, to minimize the spillage of water if the container is shaken while full of water. Thus, the cap and nipple provide sinuous narrow paths that permit the passage of air into or out of the container, while resisting the flow of water therethrough.

The filter apparatus is preferably used by filling the upper vessel with water up to an indicated fill height 111 on the filter assembly near the top of the container. The cap is then screwed on and the apparatus is placed in a refrigerator 112 (well before 10% of the water has flowed through the filter). A refrigerator typically has a temperature below 45° F,. and usually between 35° F. and 40° F. During the long period of at least 45 minutes, and generally about two hours, required for passage of about one gallon of water between the upper and lower vessels (which each have a capacity of one gallon), most of the water is considerably cooled. Applicant finds that such cooling increases the effectiveness of the activated charcoal in adsorbing chemicals. For example, oils and the like become more viscous and are more easily adsorbed at lower temperatures. The apparatus is preferably left in the refrigerator when water is removed, with the water removed by operating the spigot 14 to flow water into a glass beneath the spigot. The apparatus then being left in the refrigerator. Maintaining the apparatus in a cold state also reduces the growth of bacteria on the primary and other filters.

Applicant has constructed filter apparatus of the type illustrated. The primary filter was formed of fine granules of activated charcoal, which had a size of $20 \times 50$ mesh which is similar to the size of sand found on a beach. This provides 4½ acres of area in our 19 grams of charcoal. The preliminary filter was formed of Type 6-900Z Scotfelt formed by compressing flexible polyester polyurethane foam having 90 pores per linear inch, with pressure and heat to a thickness 1/6th of the original thickness. The pores have a width of about 35 microns. The flow control outlet filter 44 was formed by Type 12-900Z Scotfelt, which represented similar foam compressed to a height 1/12th of the original foam, and which had pores of the size of about 15-20 microns. It requires about two hours to flow one gallon of water from the upper vessel to the lower vessel.

Although the particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A water filter apparatus comprising:
    a container forming upper and lower water-holding vessels, said upper vessel having upper and lower ends;
    a filter assembly extending between said vessels, including a filter housing with an inlet opening to the upper vessel and an outlet lying below the inlet and opening to the lower vessel, a primary filter with at least a portion thereof lying between said inlet and outlet, said filter housing including a filter vent extending up from said inlet to a location nearer the upper end of the upper vessel than the lower end of the upper vessel and having a vent hole thereat to vent gas passing along a vent path extending at least partially upwardly from the top of said primary filter to the vent hole to vent gas dissolved in the water;
    said inlet comprises at least one water inlet hole in said filter housing; and
    a preliminary filter lying at said water inlet hole to block it so water passing though the hole must pass through the preliminary filter, and preliminary filter lying beside said vent path.

2. The apparatus described in claim 1 wherein:
    said filter housing includes a hollow inlet portion which has a cylindrical outside shape and which lies near the bottom of said upper vessel, said inlet portion having a plurality of largely radially-extending through holes spaced thereabout;
    said preliminary filter comprises a tubular band of resilient material which lies closely around said inlet portion in interference fit with said cylindrical shape inlet portion and which covers said holes therein.

3. The apparatus described in claim 2 wherein:

said preliminary filter lies in interference fit with said inlet portion, and portions of said tubular band lie deep within said through holes, the walls of said holes being thin enough so said portions of said tubular band extend through a majority of the hole wall thickness, whereby bubbles rising along said vent path can remove gas bubbles on the inside of said preliminary filter.

4. A water filter apparatus comprising:

a container forming upper and lower water-holding vessels, said upper vessel having upper and lower ends;

a filter assembly including a filter housing lying in both said upper and lower vessels and having an outlet in said lower vessel, said housing including a tubular portion with a plurality of inlet holes lying near the lower end of said upper vessel, and a large area-contact primary filter lying in said housing primarily between said plurality of inlet holes and said outlet;

a tubular preliminary filter formed of elastomeric material and lying about said tubular portion of said filter housing at said inlet holes therein, said preliminary filter being in interference fit with said tubular portion, and portions of said tubular preliminary filter extending into said inlet holes.

5. The apparatus described in claim 4 wherein:

said tubular portion of said filter housing extends up to near the upper end of said upper vessel and has a vent hole thereat, and the portions of said preliminary filter extend into said inlet holes lie substantially flush with inside walls of said tubular housing portion which are immediately below said extending preliminary filter portions.

6. A water filter apparatus comprising:

a substantially closed container forming upper and lower water-holding vessels, said upper vessel having upper and lower ends, said upper end having opening walls forming an opening which can receive water and which can be capped;

a filter assembly lying between said vessels to filter water in passage between said vessels, a lower vessel vent forming a tube with a lower end open to the top of said lower vessel and an upper end open to near the top of said upper vessel;

a cap covering said opening in said upper vessel;

said opening walls forming an upwardly-facing ledge and a threaded nipple of smaller width than said ledge and extending upwardly therefrom with an upper lip at its top, said nipple having an interrupted thread on its outside forming a thread-free region, and said ledge having a cutaway portion spaced from said thread-free region;

said cap having an internal thread for engaging said threaded nipple, said cap being tall enough so when screwed fully on, it abuts said ledge and leaves a free space about the top of the nipple at least at said thread-free region, to allow air to pass from the upper container around the lip and down along the thread-free region, said cap being devoid of a thread immediately above the ledge between said thread-free region and said cutaway portion of the ledge, and there being an escape opening under said cap at said cutaway portion of said ledge.

7. A water filter apparatus comprising:

a container forming upper and lower water-holding vessels, said upper vessel having upper and lower ends;

a filter assembly extending between said vessels, including a filter housing with an inlet opening to the upper vessel and an outlet lying below the inlet and opening to the lower vessel, a primary filter with at least a portion thereof lying between said inlet and outlet, said filter housing including a filter vent extending up from said inlet to a location nearer the upper end of the upper vessel than the lower end of the upper vessel and having a vent hole thereat to vent gas passing along a vent path extending at least partially upwardly from the top of said primary filter to the vent hole to vent gas dissolved in the water;

said inlet comprises at least one water inlet hole in said filter housing; and a preliminary filter lying at said water inlet hole to block it so water passing though the hole must pass through the preliminary filter, said preliminary filter lying beside said vent path; and a flow rate control filter lying between the bottom of said primary filter and said outlet, said control filter comprising a plate of foam polymer having elongated open capillaries of an average diameter less than 100 microns forming wicks for carrying water by wicking action, whereby to assure flow despite a low pressure difference on opposite sides of the control filter while assuring slow flow over a wide range of pressure differences thereacross.

8. A water filter apparatus comprising:

a container forming upper and lower water-holding vessels, said upper vessel having upper and lower ends;

a filter assembly extending between said vessels, including a filter housing with an inlet opening to the upper vessel and an outlet lying below the inlet and opening to the lower vessel, a primary filter with at least a portion thereof lying between said inlet and outlet, said filter housing including a filter vent extending up from said inlet to a location nearer the upper end of the upper vessel than the lower end of the upper vessel and having a vent hole thereat to vent gas;

said inlet comprises at least one water inlet hole in said filter housing;

a preliminary filter lying at said water inlet hole to block it so water passing though the hole must pass through the preliminary filter; and a lower vessel vent tube extending along a majority of the height of said upper vessel, said lower vessel vent tube having a lower end open to the top of the lower vessel to receive air therefrom which is displaced by water entering the lower vessel through said filter housing outlet, and said lower vessel vent tube having an open upper end for discharging air above water in the upper vessel;

said upper vessel having a vent at its top for venting gas into the environment.

9. In a water filter which includes upper and lower vessels and a filter assembly extending between them, said filter assembly including a filter housing with an inlet and an outlet respectively opening to the upper and lower vessels and also including a primary filter in the housing with at least a portion of the primary filter lying between the inlet and outlet, the improvement comprising:

a flow rate control filter lying between the bottom of said primary filter and said outlet, said control filter comprising a plate of foam polymer having elongated open capillaries of an average diameter less than 100 microns forming wicks for carring water by wicking action, whereby to assure flow despite a low pressure difference on opposite sides of the control filter while assuring slow flow over a wide range of pressure differences thereacross.

* * * * *